April 20, 1926.  A. MOORE  1,581,590

PNEUMATIC TIRE

Filed July 30, 1921

INVENTOR
Arlington Moore
BY H. H. Dyke
ATTORNEY

Patented Apr. 20, 1926.

1,581,590

UNITED STATES PATENT OFFICE.

ARLINGTON MOORE, OF NEW YORK, N. Y., ASSIGNOR TO MOORE INVENTIONS CORPORATION, OF WORCESTER, MASSACHUSETTS, A CORPORATION OF MASSACHUSETTS.

PNEUMATIC TIRE.

Application filed July 30, 1921. Serial No. 488,558.

*To all whom it may concern:*

Be it known that I, ARLINGTON MOORE, a citizen of the United States, and a resident of the borough of Manhattan, city, county, and State of New York, have invented a new and useful Improvement in Pneumatic Tires, of which the following is a specification.

My invention relates to a pneumatic tire adapted for use on automobiles, trucks and the like.

According to my invention, the tire is provided with a pair of rugged, substantial, weight-bearing flanges, one on each side of the ordinary tread. These flanges, forming substantially a prolongation of the side walls of the tire, normally project somewhat further from the base of the tire than does the usual tread surface of the tire, and carry a substantial portion of the weight. These flanges made of rubber, preferably reenforced with fabric, cords or the like, yield when weight is applied, and the weight is thus distributed between the flanges and the usual tread portion of the tire located therebetween.

With a tire so constructed extensive contact between the tire and the road is secured with corresponding improvement in tire mileage and in traction. Also very great protection is afforded against skidding or side-slipping, not only by reason of the extensive contact obtained between the tire and the road, with a consequent reduction in the critical road cohesion per unit of contact area, but also due to the fact that a tire in accordance with my invention and having three separated lines or regions of contact with the road has an inherently great power of resistance against side-slipping. Any incipient side-slip results in a "tucking under" displacement of the flanges which automatically prevents further side-slip from taking place.

Figure 1:
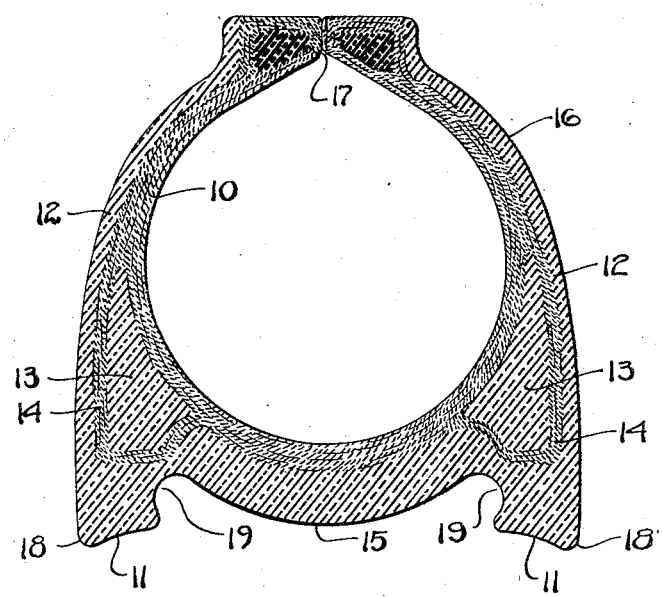
Figure 2:
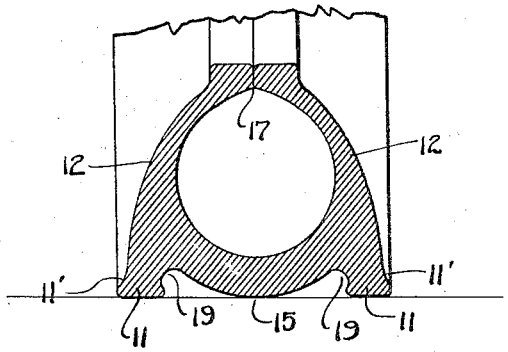

In the drawings forming a part of the specification, Fig. 1 is a cross-sectional view of a tire embodying one form of my invention, and Fig. 2 is a diagrammatical sectional view showing the tire under load. For convenience of illustration, a fabric tire is shown in Fig. 1, comprising a carcass 10 of rubberized fabric. The flanges 11, 11 are located to form substantially continuations of the side walls 12, 12 of the tire, and one way of providing same with fabric reenforces may consist in placing suitably formed rings 13, 13 of raw or partially vulcanized rubber in position over the ordinary carcass, and applying additional layers of fabric 14 over the carcass 10 and including such rings 13, 13, after which the flanges 11 are completed along with the formation and vulcanizing of the usual tread portion 15 and wall envelope 16.

When the weight comes on the tire, flanges 11 are compressed substantially as shown at 11', Fig. 2. The life of flanges 11 is increased and the wear thereon decreased by being run under compression. One result of such compression is that the flanges 11 are spread out more or less when they come into contact with the ground, as shown at 11'. It will be seen that the weight taken by the flanges 11 is transmitted to the base of the tire much more directly than weight applied at the center tread portion 15, which is located at substantially 180° from the center portion 17 at the base of the tire, whereas the weight taken by flanges 11 is transmitted through only 120° or thereabouts of the circular section. In this way there is a substantial reduction in the alternate bending and straightening out of the side walls of the tire in use as compared with the ordinary tire which gets increased bending by taking the entire load at substantially the middle of the tread.

It will be seen that in turning a corner or applying the brakes on a slippery street, or at other times where the pressure applied to the tire has a substantially great lateral component, the compressed and spread out flange 11 on the side of the tire tending to advance is tucked under somewhat, while flange 11 on the opposite side drags behind, and this effect, together with the greatly increased contact area, including the contact made by the tire tread surface 15 and the two flanges 11, 11, produces such resistance to side-slipping as to effectively prevent anything of the sort beyond the merest incipient slippage, which is substantially stopped as soon as begun.

The flanges 11 may have various forms. As shown, their greatest extension from the base of the tire is at their outer edges 18, 18 and they are of substantially hook form in cross section on their inner faces, making substantially an annular recess 19, 19 on the sides thereof adjacent to the tread portion 15. The tread 15 may be smooth or may have any of the well known "non-skid" surfaces, as will be readily understood. As the tire wears, the projection of the flanges 11 is, of course, decreased, but after the flanges have worn down even with the tread surface, the wear on the tread 15 and flanges 11 is substantially uniform.

I make use herein of the term "tread" in referring to the ordinary tread surface 15 of the tire, diametrically opposite to the center 17 of the tire base, but it is to be understood that the actual working tread, that is to say, the portion of the tire coming into contact with the road, is made up of such tread surface 15, together with the outer surfaces of the flanges 11, 11.

While I have illustrated a fabric tire, it is to be understood that same is intended only for affording an understanding of one form of tire in which the invention may be embodied, and that tires of various other forms and constructions and reenforcings may be resorted to.

It will be seen that a tire in accordance with the invention has numerous features of advantage. Better traction is obtained, and the surface or tread contact with the road is materially increased with resulting longer life of the tire and increased mileage. The added material is of such extent and so located as to distribute load and shocks substantially across the entire casing, and to secure a cushioning effect when a tire is deflated, and a wheel may be run for short distances on a flat tire without causing substantial injury to the tire or tube. The troubles of putting on and taking off tire chains are eliminated, as also the injury caused to tires by the use of tire chains. Front wheels of automobiles equipped with the improved tires respond immediately to the slightest turn of the steering wheel, insuring complete steering traction safety. The tires can be driven in deep sand or mud where ordinary tires are practically useless, and in generally by equipping an automobile with tires in accordance with the invention, the owner thereof is enabled to dispense with troublesome tire chains and to obtain from his car a service which is much more satisfactory, safe and certain than has heretofore been possible.

I claim:

In a pneumatic tire, a carcass, rings of rubber outside said carcass on each side of the tire about 120° from the center of the tire base, reenforcing material about said rings, rugged, substantial flanges forming extensions of said rings and normally projecting beyond the tread portion of the tire and adapted to be compressed when weight is put on the tire, whereby said flanges carry a substantial portion of the load and serve as a means of preventing side slippage.

In testimony that I claim the foregoing, I have signed my name hereto.

ARLINGTON MOORE.